United States Patent
Ohms et al.

(10) Patent No.: US 12,453,310 B2
(45) Date of Patent: Oct. 28, 2025

(54) HYDRAULIC CLEANING FAN DRIVE FOR COMBINE HARVESTER UTILIZING SWING-ARM ACTUATED PUMP

(71) Applicant: CNH Industrial America LLC, New Holland, PA (US)

(72) Inventors: Travis Ohms, Blue Grass, IA (US); Craig Murray, Davenport, IA (US); John Bradley Wickizer, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 470 days.

(21) Appl. No.: 18/104,373

(22) Filed: Feb. 1, 2023

(65) Prior Publication Data
US 2024/0251711 A1 Aug. 1, 2024

(51) Int. Cl.
*A01D 41/127* (2006.01)
*A01D 69/00* (2006.01)
(Continued)

(52) U.S. Cl.
CPC ........ *A01D 41/1276* (2013.01); *A01F 12/444* (2013.01); *A01F 12/56* (2013.01); *A01D 69/00* (2013.01)

(58) Field of Classification Search
CPC ..... A01F 12/00–12/60; A01D 41/1276; A01D 69/00–69/12
See application file for complete search history.

(56) References Cited

U.S. PATENT DOCUMENTS

| 3,550,463 A | 12/1970 | Halls |
| 4,914,896 A * | 4/1990 | Gullickson ............ A01D 57/10 |
| | | 56/12.9 |

(Continued)

FOREIGN PATENT DOCUMENTS

| CN | 113179743 A * | 7/2021 | ............ A01D 41/12 |
| CN | 216254070 U | 4/2022 | |

(Continued)

OTHER PUBLICATIONS

The Extended European Search Report issued Jun. 12, 2024, by the European Patent Office in corresponding European Patent Application No. 24 154 645.6. (6 pages).

*Primary Examiner* — Joseph M Rocca
*Assistant Examiner* — Madeline I Runco
(74) *Attorney, Agent, or Firm* — Buchanan Ingersoll & Rooney PC

(57) ABSTRACT

An assembly for selectively activating a cleaning fan of a combine harvester. The assembly includes a hydraulic pump for distributing power to the cleaning fan. The hydraulic pump is movably connected to a fixed point, and is configured to move between first and second positions. The hydraulic pump has an input portion for receiving power and a pressurized fluid port for distributing fluid to power the cleaning fan. A drive belt is wound about the input portion of the hydraulic pump and a drive pulley of the combine harvester. An actuator is provided for selectively moving the hydraulic pump between the first position, in which the drive belt is maintained in a state of tension such that the drive pulley can drive the cleaning fan, and the second position, in which the drive belt is maintained in a relaxed state such that the drive pulley cannot drive the cleaning fan.

12 Claims, 4 Drawing Sheets

(51) Int. Cl.
*A01F 12/44* (2006.01)
*A01F 12/56* (2006.01)

(56) References Cited

U.S. PATENT DOCUMENTS

| | | |
|---|---|---|
| 8,052,374 B2 | 11/2011 | Ricketts |
| 9,119,350 B2 | 9/2015 | Stan et al. |
| 9,867,325 B2 | 1/2018 | Clifford et al. |
| 2005/0020331 A1* | 1/2005 | Sahr .................. F04D 25/02 460/99 |
| 2012/0184339 A1 | 7/2012 | Schulz |
| 2016/0024991 A1* | 1/2016 | Smemo ................ F16H 9/04 474/4 |
| 2018/0009305 A1* | 1/2018 | Nelson ................ F02B 73/00 |
| 2019/0289787 A1 | 9/2019 | Heitmann et al. |
| 2021/0227751 A1 | 7/2021 | Fattepur et al. |
| 2023/0320272 A1* | 10/2023 | Hermann .......... A01D 41/1274 460/1 |

FOREIGN PATENT DOCUMENTS

| | | | |
|---|---|---|---|
| CN | 114731851 A | 7/2022 | |
| DE | 10005067 C1 | 5/2001 | |
| DE | 10036612 B4 * | 9/2005 | ............ A01F 29/16 |
| EP | 2052824 A2 | 4/2009 | |
| EP | 4548747 A1 * | 5/2025 | ............ A01D 69/03 |
| GB | 1044820 | 10/1966 | |
| JP | H06144069 A * | 5/1994 | |
| JP | H10299845 A * | 11/1998 | |
| JP | 4363490 B2 | 11/2009 | |
| KR | 20210116903 A | 9/2021 | |
| WO | 2022090825 A1 | 5/2022 | |

* cited by examiner

HYDRAULIC CLEANING FAN DRIVE FOR COMBINE HARVESTER UTILIZING SWING-ARM ACTUATED PUMP

FIELD OF THE INVENTION

The present invention relates to a combine harvester. More particularly, the invention relates to a hydraulic cleaning fan drive for a combine harvester. And, even more particularly, the invention relates to a swing arm actuated pump for selectively powering the cleaning fan drive.

BACKGROUND OF THE INVENTION

As is described in U.S. Pat. No. 9,119,350 (the '350 Patent), which is incorporated by reference in its entirety and for all purposes, modern combine harvesters can be used for harvesting and threshing a wide range of agricultural products. Combine harvesters include a threshing mechanism where the crop material is threshed in order to separate grains from the discardable part of the crop, and grain cleaning systems where clean grain kernels are separated from other crop particles. In particular, in typical combine harvesters for harvesting crop material, grain is threshed and separated in a threshing and separating mechanism and the separated grain, together with impurities of all sorts, such as chaff, dust, straw particles and tailings, are fed to a cleaning system or mechanism for cleaning. Clean grain is collected below the cleaning system and fed to a grain tank for temporary storage. The tailings are separated from the clean grain and impurities by means of sieves and provisions are taken for recycling the tailings through the combine harvester for reprocessing. This reprocessing involves either recycling the tailings through the threshing and separating mechanism and/or treating them in a separate tailings rethresher means.

Cleaning systems are not required to run at all times during operation of the combine. It would be beneficial to provide a cost-effective solution for selectively deactivating the cleaning system in a simple manner while operating within the limited space constraints of a modern combine.

SUMMARY OF THE INVENTION

According to one aspect of the invention, an assembly for selectively activating a cleaning fan of a cleaning system of a combine harvester is provided. The assembly includes a hydraulic pump for either directly or indirectly powering the cleaning fan. The hydraulic pump is movably connected to a fixed point, and is configured to move between a first position and a second position. The hydraulic pump has an input portion for receiving power and a pressurized fluid port for distributing fluid to power the cleaning fan. A drive belt is wound about the input portion of the hydraulic pump as well as a drive pulley of the combine harvester. An actuator is provided for selectively moving the hydraulic pump between the first position and the second position. In the first position of the hydraulic pump, the hydraulic pump is positioned such that the belt is maintained in a state of tension on the input portion of the hydraulic pump as well as the drive pulley, and in the state of tension of the drive belt, the drive belt is configured to transfer power from the drive pulley to the input portion of the hydraulic pump, which activates the hydraulic pump to cause rotation of the cleaning fan. In the second position of the hydraulic pump, the hydraulic pump is positioned such that the belt is maintained in a relaxed state on the input portion of the hydraulic pump and/or the drive pulley, and in the relaxed state of the drive belt, the drive belt is not configured to transfer power from the drive pulley to the input portion of the hydraulic pump.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
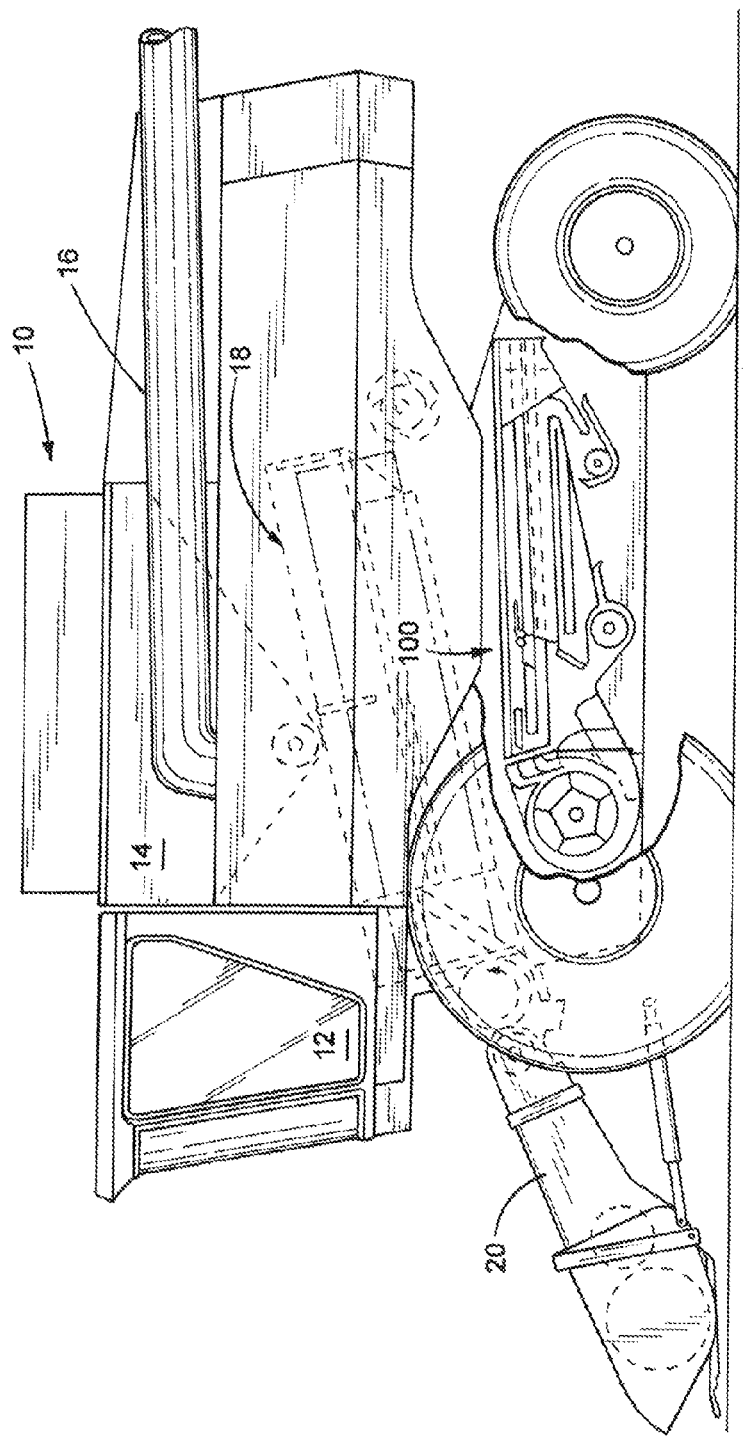
FIG. 1 is a side elevation view of an agricultural combine in accordance with a preferred embodiment of the present invention.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Figure 2:
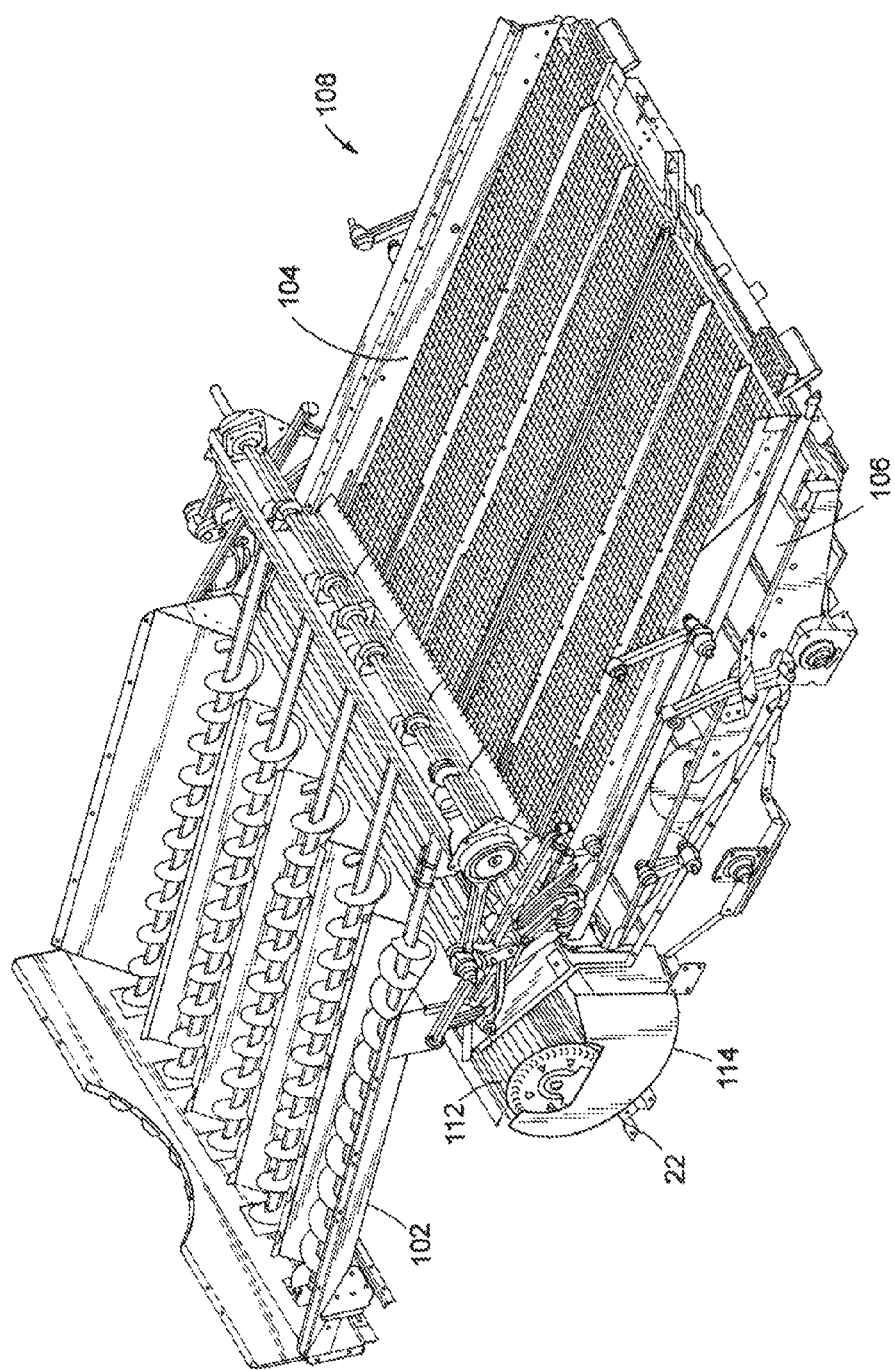
FIG. 2 is a partial top perspective view of a grain cleaning system of the agricultural combine of FIG. 1.

Referring now to the drawings, and more particularly to FIGS. 1 and 2, the present invention provides an agricultural combine harvester 10 having a grain cleaning system 100. The agricultural combine 10 includes, among other components, a cab 12, a grain tank 14, an unloading auger 16, a threshing and separating section 18, and a feederhouse 20. Such components of the agricultural combine 10 are known and therefore a detailed description of their structure, function and operation is not necessary for a complete understanding of the present invention. However, a further description of such agricultural combine components is disclosed in U.S. patent Application Publication No. 2012/0184339, the entire disclosure of which is hereby incorporated by reference herein in its entirety.

Referring to FIG. 2, the agricultural combine 10 includes a support structure 22 onto which the grain cleaning system 100 is attached or mounted to. The support structure 22 can be any portion of the agricultural combine's frame, chassis or other support member.

The grain cleaning system 100 applicable to the present invention can include a first grain pan 102, a pre-cleaning sieve positioned above a second grain pan, an upper sieve 104 and a lower sieve 106. The upper and lower sieves 104, 106 are positioned within a cleaning shoe 108 that functions to house and operate the sieves 104, 106. The cleaning shoe 108 constitutes the framework of reinforcement girders surrounding the upper and/or lower sieves. Alternatively, the grain cleaning system of a combine applicable to the present invention can include an auger bed instead of a grain pain. Such auger beds and grain pains as well known in the art and a detailed description of their structure, function and operation is not necessary for a complete understanding of the present invention.

Grain which has been separated by the threshing and separating mechanism 18 falls into the grain cleaning system 100. Within the grain cleaning system 100, the grains fall onto the first grain pan 102 and are then transported to the pre-cleaning sieve positioned above the second grain pan. Grain is then processed to the upper sieve 104 and then the lower sieve 106. The first grain pan 102 collects the separated grain particles and transports the mixture of chaff and grain to the front end of a pre-cleaning sieve or directly to an upper sieve 104. The upper sieve 104 separates the small fraction from the larger particles. The residual fraction of chaffs, short straw and other sieve losses leaves the back side of the upper sieve 104 while the separated fraction is processed by the lower sieve 106. The lower sieve 106 separates the clean grain fraction from the return flow fraction.

The grain cleaning system 100 includes a blower having a fan 112 and a housing 114 that houses or substantially houses the fan 112. The fan 112 can be any fan applicable for a grain cleaning system of an agricultural combine, thus a detailed description of such fans is not necessary for a complete understanding of the present invention. However, exemplary fans applicable to the present invention include a transverse fan as disclosed in detail in U.S. Pat. No. 8,052,374, the entire disclosure of which is hereby incorporated by reference herein. The fan 112 rotates about an axis to provide for a flow of high velocity air to an inlet end of the cleaning shoe 108. The fan 112 provides and directs a flow of high velocity air into the cleaning shoe 108 to clear and clean the cleaning shoe 108 of material other than grain and to help maintain operations of the cleaning shoe 108 at normal speeds.

Figure 3:
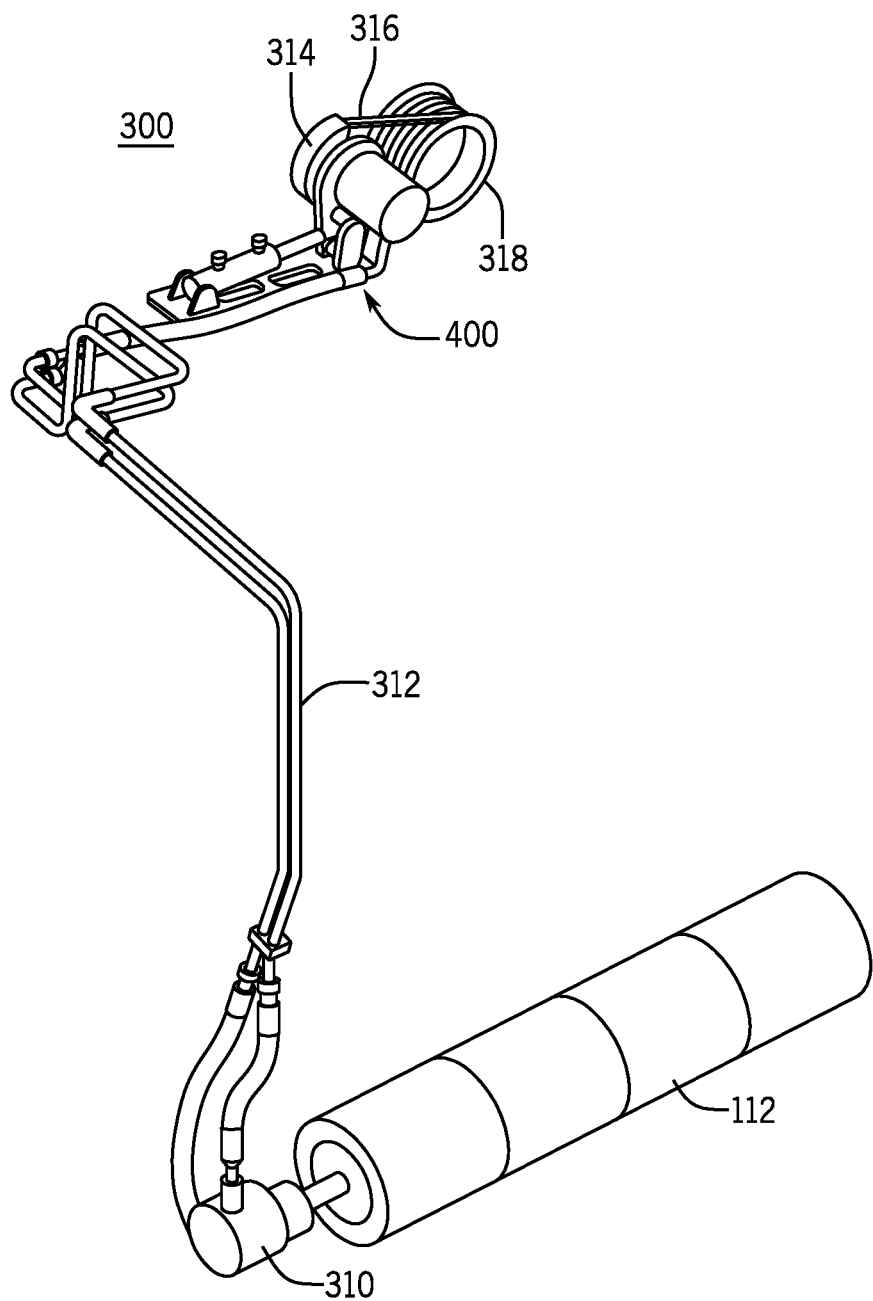
FIG. 3 shows a system for selectively powering the cleaning fan of the cleaning system of FIG. 2.

Turning now to FIG. 3, that figure depicts a system 300 for selectively powering the cleaning fan 112 of the grain cleaning system 100 of FIG. 2. System 300 generally includes fan 112 that is powered by a hydraulic motor 310. Activation of motor 310 causes fan 112 to rotate about its axis of rotation. Hydraulic lines 312 fluidly connect hydraulic motor 310 to a hydraulic pump 314. Hydraulic pump 314 is connected to a rotatable drive pulley 318 by a belt 316. Drive pulley 318 is rotatable about a fixed axis 319 (FIG. 4) and receives power from the engine of the combine 10 via either a power take off shaft or a hydraulic motor (not shown), for example. According to Wikipedia, hydraulic pumps are used in hydraulic drive systems and can be either hydrostatic or hydrodynamic. A hydraulic pump is a mechanical source of power that converts mechanical power into hydraulic energy (hydrostatic energy i.e. flow, pressure).

In basic operation of cleaning system 100, the engine of combine 10 rotates drive pulley 318, as described above. The input shaft 425 (FIG. 4) of pump 314 is rotated by the drive pulley 318 via the belt 316 that is wrapped around both the input shaft 425 of pump 314 and the outer-facing belt grooves on the drive pulley 318. Pump 314 causes hydraulic fluid to flow through lines 312 and into motor 310. The introduction of hydraulic fluid into motor 310 causes rotation of the output shaft of motor 310. Rotation of the output shaft of motor 310, which is connected to the input shaft of fan 112, causes rotation of fan 112.

It is noted that drive pulley 318 is also connected to other components of the combine via belts (not shown) for powering those other components of the combine 10. Drive pulley 318 may rotate at most (or all) times during operation of the combine, whereas the fan 112 of cleaning system 100 does not necessarily (need to) rotate at all times during operation of the combine 10. Stated differently, the fan 112 of cleaning system 100 does not necessarily (need to) rotate at all times during rotation of the drive pulley 318.

Figure 4:
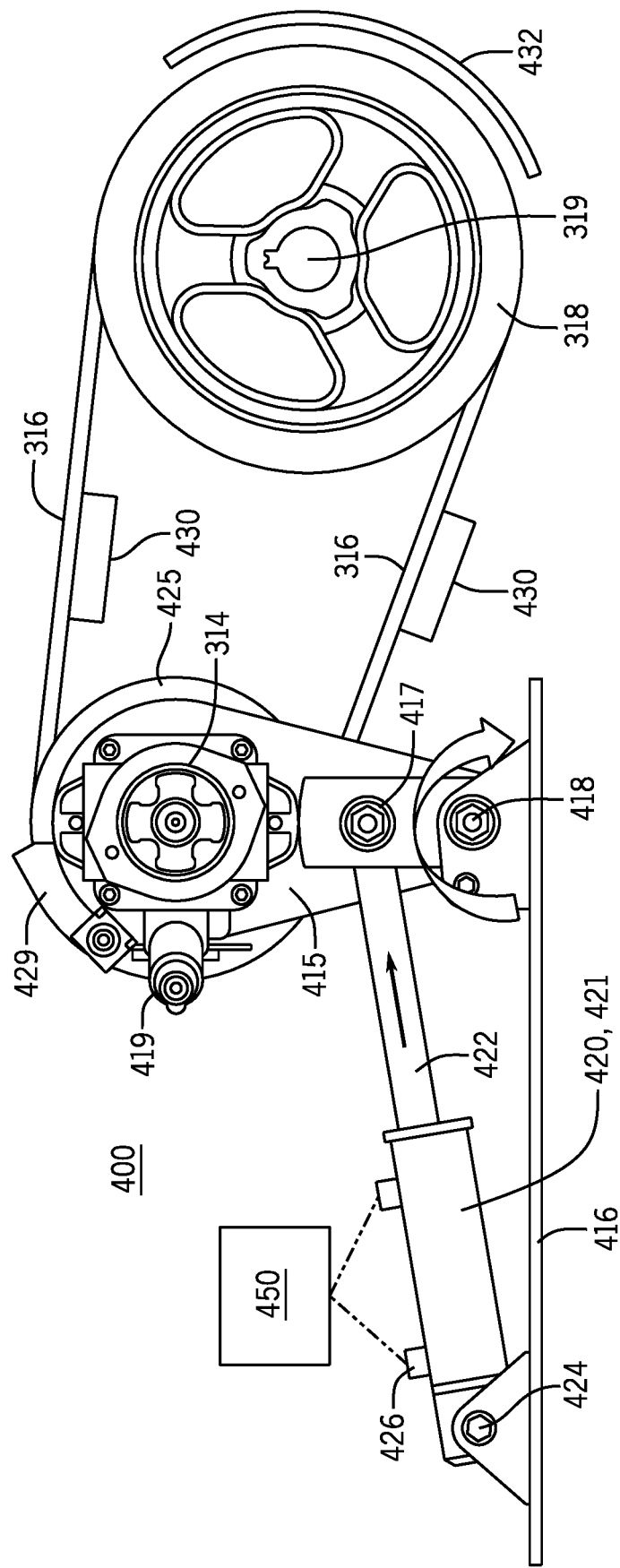
FIG. 4 shows a detailed view of a sub-assembly of the system of FIG. 3, the sub-assembly including a swing-arm actuated pump that is selectively powered by a drive pulley.

Turning now to FIG. 4, that figure shows a detailed view of a sub-assembly 400 of the system 300 of FIG. 3. The sub-assembly 400 comprises hydraulic pump 314, which may be referred to herein as a swing-arm actuated pump, that is connected to the drive pulley 318 via the belt 316, as was described above. Pump 314 includes a housing 415 that is rotatable connected to a fixed surface 416 (or fixed point) about a pivot point 418. More generally, pump housing 415 may be movably (e.g., either rotatably or translatably) mounted to the fixed surface 416. Lines 312 are sufficiently flexible to accommodate movement of the housing 415 to which they are connected. Pump 314 includes an input portion 425 that is connected to internal shaft(s) of the pump 314 for pressurizing the fluid passing through pump 314, as is known in the art. Pump housing 415 includes one or more fluid ports 419 that is/are fluidly connected to fluid lines 312.

Sub-assembly 400 also includes a linear actuator 420 that is coupled to pump housing 415 for rotating the pump housing 415 about pivot point 418. Actuator 420 includes a cylinder 421 having a hollow interior region in which a piston 422 plunges and translates. Piston 422 is rotatably connected to housing 415 residing at a pivot point 417 on the housing 415 at an elevation above pivot point 418. Connection to the housing 415 may be either direct or indirect. For example, the pivot point 417 may be defined on a different structure to which the pump 314 is mounted. Cylinder 421 is pivotably connected to fixed surface 416 by a second pivot point 424 that is spaced apart from the first pivot point 418.

Actuator 420 may be either a single-acting or double-acting hydraulic actuator having fluid ports 426. Alternatively, actuator 420 may be any other type of actuator such as an electrically powered linear actuator, a pneumatic actuator, a solenoid, etc.

Turning now to operation of sub-assembly 400, in FIG. 4 the sub-assembly 400 is shown positioned in a tension state. In the tension state, the actuator piston 422 is extended to a position such that the pump housing 415 is rotated to a position such that the belt 316 has sufficient tension to transfer power from the drive pulley 318 to the input shaft 425 of the pump 314. Stated differently, in the tension state, power is transferred from the drive pulley 318 to the pump 314 via the belt 316. And, as described above, the shaft 425 of the pump 314 ultimately powers the fan 112.

To move from the above-described tension state to a relaxed state, the actuator 420 is activated to cause extension of the piston 422 in the direction of the straight arrow in FIG. 4. Extension of piston 422 causes pump 314 to rotate about pivot pin 418 in the direction of the curved arrow in FIG. 4. Rotation of pump 314 in that direction causes the pump 314 to move toward the pulley 318, which relaxes the tension on the belt 316. In the relaxed state, the belt 316 can remain on the input shaft 425 of the pump 314 as a result of the belt sheath 429, whereas the belt 316 lifts off of the grooves on the pulley 318, as guided by the belt guides 430 and 432. Thus, belt 316 can no longer transmit power from drive pulley 318 to the input shaft 425 of pump 314. Accordingly, the rotating drive pulley 318 is disconnected from and ceases to distribute power to fan 112.

Operation of actuator 420 may be controlled in an automated manner by a computer-controlled hydraulic or pneumatic pump 450 based upon inputs or instructions received from a computer/processor/controller of the combine. The fluid/air connections between the actuator 420 and pump 450 are depicted in broken lines. For example, when it is desired to deactivate the fan 112 of the cleaning system, the computer processor 420 can move the actuator 420 to a position resulting in the belt 316 moving to the relaxed state. Conversely, when it is desired to activate the fan 112 of the cleaning system, the computer processor 420 can move the actuator 420 to a position resulting in the belt 316 moving to the tension state. Alternatively, item 450 may represent a computer controller that is configured to activate an electrical actuator. As another alternative, actuator 420 may be controlled in a manual fashion.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An assembly for selectively activating a cleaning fan of a cleaning system of a combine harvester, said assembly comprising:
    a hydraulic pump for either directly or indirectly powering the cleaning fan, the hydraulic pump being movably connected to a fixed point and moveable between a first position and a second position, the hydraulic pump having an input portion for receiving power and a pressurized fluid port for distributing fluid to power the cleaning fan;
    a drive belt wound about the input portion of the hydraulic pump as well as a drive pulley of the combine harvester; and
    an actuator for selectively moving the hydraulic pump between the first position and the second position,
    wherein, in the first position of the hydraulic pump, the hydraulic pump is positioned such that the belt is maintained in a state of tension on the input portion of the hydraulic pump as well as the drive pulley, and in the state of tension of the drive belt, the drive belt is configured to transfer power from the drive pulley to the input portion of the hydraulic pump, which activates the hydraulic pump to cause rotation of the cleaning fan, and
    wherein, in the second position of the hydraulic pump, the hydraulic pump is positioned such that the belt is maintained in a relaxed state on the input portion of the hydraulic pump and/or the drive pulley, and in the relaxed state of the drive belt, the drive belt is not configured to transfer power from the drive pulley to the input portion of the hydraulic pump.

2. The assembly of claim 1, wherein the hydraulic pump is rotatably connected to the fixed point.

3. The assembly of claim 1, wherein the actuator is either a hydraulic actuator or an electric linear actuator.

4. The assembly of claim 1, further comprising a hydraulic motor that is fluidly connected to the pressurized fluid port of the hydraulic pump, wherein an output shaft of the hydraulic motor is non-rotatably connected to an input shaft of the cleaning fan for rotating the input shaft.

5. The assembly of claim 4, wherein the hydraulic motor is fluidly connected to the pressurized fluid port of the hydraulic pump by flexible fluid lines.

6. The assembly of claim 1, wherein a tension in the belt is greater in the state of tension than in the relaxed state.

7. The assembly of claim 1, further comprising belt guides for guiding the belt away from the drive pulley in the relaxed state.

8. The assembly of claim 1, wherein an axis of rotation of the drive pulley remains stationary in both the first position and the second position of the hydraulic pump.

9. The assembly of claim 1, further comprising a computer-controlled pump for controlling the actuator to selectively move the hydraulic pump between the first position and the second position.

10. The assembly of claim 1, wherein the actuator includes a cylinder having a hollow interior region and a piston that is at least partially positioned within the hollow interior region, wherein the cylinder is rotatably connected to a fixed point on the combine harvester, and an end of the piston that extends outside of the cylinder is rotatably connected to the hydraulic pump.

11. The assembly of claim 1, further comprising the drive pulley, wherein the drive pulley is configured to receive power from an engine of the combine harvester.

12. An agricultural vehicle comprising the assembly of claim 1.

* * * * *